Patented Sept. 28, 1954

2,690,443

UNITED STATES PATENT OFFICE 2,690,443

SULFUROUS ACID ADDITION COMPOUND OF 2-AMINO-5-NITRO THIAZOLE

Robert P. Parker, Somerville, and William B. Wright, Jr., Plainfield, N. J., assignors to American Cyanamid Company, New York, N. Y., a corporation of Maine No Drawing. Application May 14, 1952,
Serial No. 287,804

1 Claim. (Cl. 260—306.7)

This invention relates to a new organic compound. More particularly, it relates to a water soluble derivative of 2-amino-5-nitrothiazole.

The compound 2-amino-5-nitrothiazole is a known compound, having first been described by K. Ganapathi et al. (Proceedings Indian Academy of Science, 22–A, 343–378 (1945)). This compound has received widespread publicity because of its effectiveness in the treatment of protozoan infections. One of the greatest drawbacks to the use of the compound is its relative insolubility, it being soluble in water only to the extent of 0.1%. Since for many therapeutic uses it is desirable to have a stronger solution of the compound, a water soluble derivative is required which will retain full activity, be stable as a solid and also in aqueous solution. In a copending application of Jackson P. English, Serial Number 201,888, filed December 20, 1950, now abandoned, there is described a method of preparing alkali metal metabisulfite addition compounds of 2-amino-5-nitrothiazole. These compounds, while soluble to a greater extent than 2-amino-5-nitrothiazole itself, are difficult to prepare on a large scale because of the powerful stirring facilities necessary in preparing such compounds. The products disclosed in the application of English tend to be unstable on standing in aqueous solution and therefore undesirable where an aqueous solution is to be used over a period of time.

We have now found that 2-amino-5-nitrothiazole can be made to form a water soluble, stable, crystalline product by suspending 2-amino-5-nitrothiazole in water and passing into the suspension sulfur dioxide. The product obtained is the sulfurous acid addition compound of 2-amino-5-nitrothiazole which is stable and can be stored for long periods without decomposition. It is soluble in water to the extent of about 3% at room temperatures and the aqueous solutions are stable on storage at room temperatures for at least several weeks.

In carrying out the process of the present invention 2-amino-5-nitrothiazole is suspended in a substantially aqueous solvent and sulfur dioxide gas is passed into the suspension until the reaction is complete. The temperature can be maintained at from about 10° C. to about 90° C., preferably 20° to 80° C. When about 40 parts of substantially aqueous solution is used to each part of 2-amino-5-nitrothiazole at room temperature, all of the solid goes into solution with slight evolution of heat and the solution may be clarified with activated carbon if desired. On concentration under reduced pressure at 25° to 40° C., to about 5 to 10 parts by volume, the product is obtained in high yields. On the other hand, if a more concentrated solution, such as one part of 2-amino-5-nitrothiazole to 5 parts of water, is treated with sulfur dioxide gas at room temperature, the character of the material changes with some evolution of heat and the sulfurous acid addition compound of 2-amino-5-nitrothiazole is obtained by simply cooling and filtering off the product. The process can also be carried out by suspending 2-amino-5-nitrothiazole in about 10 parts of water, heating to 80° C., passing in sulfur dioxide until the sulfurous acid addition product is formed, clarifying if desirable, and cooling the solution. The product is isolated by filtration or by other methods well known in the art.

The process of the present invention can also be carried out by adding 2-amino-5-nitrothiazole to a solution of sulfurous acid in water. This reaction is conducted under pressure or at normal atmospheric pressure. While it is desirable to use a substantially aqueous solvent, a mixture of water and other solvents, such as alcohols, can be used.

One of the most desirable features of the process of the present invention is that the quality of the 2-amino-5-nitrothiazole is not critical, and the crude material such as that resulting from the neutralized reaction product of the nitration of 2-aminothiazole can be used successfully. The process of the present invention further affords a new method for purification of crude 2-amino-5-nitrothiazole since it can be recovered from the sulfurous acid addition compound of 2-amino-5-nitrothiazole by adjusting an aqueous solution at about pH 5 and allowing the solution to stand.

The sulfurous acid addition compound of 2-amino-5-nitrothiazole is useful as a fungicide and in the treatment of protozoan infections such as those caused by the flagellate, *Trichomonas vaginalis*. The product can be of value in the treatment of other pathological conditions where the causative agent is a protozoan organism.

The following examples specifically illustrate the preparation of the sulfurous acid addition compound of 2-amino-5-nitrothiazole by the various modifications described above. All parts are by weight unless otherwise indicated.

Example 1

Sulfur dioxide gas is passed into a suspension of 100 parts of 2-amino-5-nitrothiazole in 4000 parts of water at about 25° C. until solution occurs (one and one-half to two hours). The reaction is stirred for 10 minutes with 10 parts of activated carbon (Darco G-60) and filtered. The filtrate is concentrated under reduced pressure to about 500 parts and the yellowish needles which separate are filtered off, washed with water and dried. The yield is 84%. This material begins to darken at about 175° C. and decomposes about 190° C. It shows an analysis corresponding to an addition product of one mole of sulfurous acid to one mole of 2-amino-5-nitrothiazole, having the empirical formula: $C_3H_3N_3O_2S \cdot H_2SO_3$.

*Example 2*

Sulfur dioxide gas is passed into a suspension of 100 parts of 2-amino-5-nitrothiazole in 500 parts of water at 25°–35° C. for seven hours. The reaction mixture is cooled to 20° C. and an 83% yield of yellow product is obtained. This product has the same characteristics of that in Example 1.

*Example 3*

400 parts of water is saturated with sulfur dioxide gas and 10 parts of 2-amino-5-nitrothiazole is added. The mixture is stirred for one and one-half hours and solution occurs. The solution is concentrated under reduced pressure and a 79% yield of the 2-amino-5-nitrothiazole-sulfurous acid addition product is obtained.

*Example 4*

10 parts of 2-amino-5-nitrothiazole is slurried in a mixture of 50 parts of ethanol and 50 parts of water and sulfur dioxide gas is passed in for six hours. On filtering the same product as that described in the examples above is obtained.

*Example 5*

A mixture of 15 parts of 2-amino-5-nitrothiazole and 150 parts of water is heated to 80° C. and sulfur dioxide gas is passed in for 15 minutes at 80°–85° C. The reaction is treated with activated carbon and filtered. On cooling, light yellow crystals of the 2-amino-5-nitrothiazole-sulfurous acid addition product separate. The yield is 69%.

*Example 6*

Sulfur dioxide gas is passed into a mixture of 15 parts of 2-amino-5-nitrothiazole and 150 parts of water and as the temperature is gradually increased to 50°–55° C., solution occurs. The reaction is held at this temperature for 30 minutes and then heated to 80° C. After treatment with activated carbon, it is cooled and the light yellow product is filtered and dried. The yield is 79%.

We claim:

The sulfurous acid addition compound of 2-amino-5-nitrothiazole having the following chemical structure:

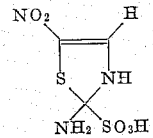

References Cited in the file of this patent

UNITED STATES PATENTS

| Number | Name | Date |
|---|---|---|
| 2,489,038 | Kuh et al. | Nov. 22, 1949 |
| 2,531,756 | Waletzky et al. | Nov. 28, 1950 |
| 2,574,155 | Parker et al. | Nov. 6, 1951 |